US012794898B1

(12) United States Patent
Pineda Yabut, IV et al.

(10) Patent No.: US 12,794,898 B1
(45) Date of Patent: Nov. 10, 2026

(54) COMPUTING NETWORK FOR SELECTIVELY PROVIDING ACCESS TO AND COMMUNICATING WITH USERS IN A COMPUTING GROUP

(71) Applicant: Veeva Systems Inc., Pleasanton, CA (US)

(72) Inventors: Geminiano Romano Pineda Yabut, IV, San Jose, CA (US); Joby George, Marlboro Township, NJ (US); Jason Hardin, Carmel, IN (US)

(73) Assignee: Veeva Systems Inc., Pleasanton, CA (US)

( * ) Notice: Subject to any disclaimer, the term of this patent is extended or adjusted under 35 U.S.C. 154(b) by 16 days.

(21) Appl. No.: 19/097,305

(22) Filed: Apr. 1, 2025

(51) Int. Cl.
*H04L 9/40* (2022.01)
*H04L 51/04* (2022.01)

(52) U.S. Cl.
CPC ............ *H04L 63/104* (2013.01); *H04L 51/04* (2013.01)

(58) Field of Classification Search
CPC .............................. H04L 63/104; H04L 51/04
USPC ........................................................... 726/27
See application file for complete search history.

(56) References Cited

U.S. PATENT DOCUMENTS

| | | | | |
|---|---|---|---|---|
| 10,721,193 B1 * | 7/2020 | Chitrapu | ................. | G06F 18/22 |
| 10,902,146 B2 * | 1/2021 | Deering | .................. | G06F 9/542 |
| 11,212,651 B1 * | 12/2021 | Nugumanov | ........... | H04W 4/12 |
| 12,244,549 B2 * | 3/2025 | Boyd | ...................... | G06F 9/542 |

* cited by examiner

*Primary Examiner* — Amare F Tabor
(74) *Attorney, Agent, or Firm* — FINNEGAN, HENDERSON, FARABOW, GARRETT & DUNNER, LLP

(57) ABSTRACT

This disclosure is directed to selectively providing access to and communicating with a computing group. The disclosed method includes: determining a first user accesses a system; determining a first computing group, comprising a second user and a third user, associated with the first user; receiving a selection associated with the first computing group; modifying the first computing group, thereby generating a modified first computing group comprising the third user and a second computing group, comprising a fourth user, associated with the second user; receiving a selection of the second computing group; receiving a selection of the fourth user; receiving a selection of a message option; generating a message object associated with the fourth user and at least one criteria associated with the fourth user; receiving an input associated with the message object; and receiving a selection of a send option.

22 Claims, 10 Drawing Sheets

700

My Team > User 5's Team
Learner Details: User 6

Open Completed All Training Matrix 1-8 of 8

| Name | Assigned Date | Due Date | Days Overdue | Criteria Type | Lifecycle State | Learner Role | Curriculum | Creation Source |
|---|---|---|---|---|---|---|---|---|
| *Criteria 1* | 1/31/2025 3:48 PM PST | **02/14/2025** | 0 | Training Assignment | Assigned | Manufacturing Tech | Other Manufacturing | System |
| *Criteria 2* | 1/31/2025 3:48 PM PST | **02/14/2025** | 0 | Training Assignment | Assigned | Manufacturing Tech | Other Manufacturing | System |
| *Criteria 3* | 1/31/2025 3:48 PM PST | **02/14/2025** | 0 | Training Assignment | Assigned | Manufacturing Tech | Other Manufacturing | System |
| *Criteria 4* | 1/31/2025 3:48 PM PST | **02/14/2025** | 0 | Training Assignment | Assigned | Manufacturing Tech | Other Manufacturing | System |
| *Criteria 5* | 1/28/2025 11:05 AM PST | **02/11/2025** | 0 | Training Assignment | Assigned | Manufacturing Tech | Manufacturing | System |
| *Criteria 6* | 1/21/2025 11:02 PM PST | **02/05/2025** | 1 | Training Assignment | Assigned | Manufacturing Tech | Manufacturing | System |
| *Criteria 7* | 1/21/2025 11:02 PM PST | **02/05/2025** | 1 | Training Assignment | Assigned | Manufacturing Tech | Manufacturing | System |
| *Criteria 8* | 1/21/2025 11:02 PM PST | **02/05/2025** | 1 | Training Assignment | Assigned | Manufacturing Tech | Manufacturing | System |

702

FIG. 7

COMPUTING NETWORK FOR SELECTIVELY PROVIDING ACCESS TO AND COMMUNICATING WITH USERS IN A COMPUTING GROUP

TECHNICAL FIELD

This disclosure is directed to selectively providing access to and communicating within a computing group.

BACKGROUND

In computing systems, there is a need to selectively provide access and facilitate communications between users within a computing group.

SUMMARY

This disclosure is directed to methods, systems, and computer program products for selectively providing access to and communicating with a computing group. According to an embodiment, a method for selectively providing access to and communicating with a computing group comprises: determining, using one or more computing device processors, a first user accesses a first system; receiving, using the one or more computing device processors, from a first computing device associated with the first user, a first selection, wherein the first selection comprises a first computing group associated with the first user; transmitting, using the one or more computing device processors, the first computing group for display on a first user interface associated with the first computing device associated with the first user, wherein the first computing group comprises a second user and a third user; receiving, using the one or more computing device processors, from the first computing device associated with the first user, a second selection, wherein the second selection comprises a structural option associated with the first computing group; modifying, using the one or more computing device processors, based on the second selection, the first computing group associated with the first user, thereby generating a modified first computing group, wherein the modified first computing group comprises the third user and a second computing group associated with the second user; transmitting, using the one or more computing device processors, the modified first computing group for display on the first user interface associated with the first computing device associated with the first user; receiving, using the one or more computing device processors, from the first computing device associated with the first user, a third selection, wherein the third selection comprises the second computing group associated with the second user; transmitting, using the one or more computing device processors, the second computing group for display on the first user interface associated with the first computing device associated with the first user, wherein the second computing group comprises the second user and a fourth user, wherein the structural option associated with the first computing group remains visible on the first user interface; receiving, using the one or more computing device processors, from the first computing device associated with the first user, a fourth selection, wherein the fourth selection comprises the fourth user; receiving, using the one or more computing device processors, from the first computing device associated with the first user, a fifth selection, wherein the fifth selection comprises a message option; generating, using the one or more computing device processors, based on the fourth selection and the fifth selection, a message object, wherein the message object is associated with the fourth user, and wherein the message object is associated with a first criteria associated with the fourth user; transmitting, using the one or more computing device processors, the message object for display on the first user interface associated with the first computing device associated with the first user; receiving, using the one or more computing device processors, from the first computing device associated with the first user, a first input, wherein the first input is associated with the message object; and receiving, using the one or more computing device processors, from the first computing device associated with the first user, a sixth selection, wherein the sixth selection comprises a send option.

In some embodiments, the first computing group comprises at least three users.

According to other embodiments, the modified first computing group comprises at least two computing groups.

In one embodiment, the second computing group comprises at least three users.

According to another embodiment, the second computing group comprises at least one computing group.

In some cases, the method further comprises: determining, using the one or more computing device processors, the fourth user accesses the first system; transmitting, using the one or more computing device processors, based on the sixth selection, the first input for display on a second user interface associated with a second computing device associated with the fourth user; receiving, using the one or more computing device processors, from the second computing device associated with the fourth user, a seventh selection, wherein the seventh selection is associated with the first input; and transmitting, using the one or more computing device processors, based on the seventh selection, the first criteria for display on the second user interface associated with the second computing device associated with the fourth user.

According to one embodiment, the fourth selection further comprises a fifth user.

Furthermore, in other cases, the method further comprises: determining, using the one or more computing device processors, the fifth user accesses the first system; transmitting, using the one or more computing device processors, based on the sixth selection, the first input for display on a third user interface associated with a third computing device associated with the fifth user; receiving, using the one or more computing device processors, from the third computing device associated with the fifth user, an eighth selection, wherein the eighth selection is associated with the first input; and transmitting, using the one or more computing device processors, based on the eighth selection, the first criteria or a second criteria associated with the fifth user for display on the third user interface associated with the third computing device associated with the fifth user.

In one embodiment, the method further comprises: transmitting, using the one or more computing device processors, based on the fourth selection or an eighth selection, the first criteria associated with the fourth user for display on the first user interface associated with the first computing device associated with the first user.

According to some embodiments, the one or more computing device processors are comprised in one or more computing systems, wherein the one or more computing systems are located in one or more locations.

According to another embodiment, a system for selectively providing access to and communicating with a computing group associated with a user comprises: one or more hardware computing system processors; and at least one memory storing instructions, that when executed by the one or more hardware computing system processors causes the one or more hardware computing system processors to: determine a first user accesses a first system; receive, from a first computing device associated with the first user, a first selection, wherein the first selection comprises a first computing group associated with the first user; transmit the first computing group for display on a first user interface associated with the first computing device associated with the first user, wherein the first computing group comprises a second user and a third user; receive, from the first computing device associated with the first user, a second selection, wherein the second selection comprises a structural option associated with the first computing group; modify, based on the second selection, the first computing group associated with the first user, thereby generating a modified first computing group, wherein the modified first computing group comprises the third user and a second computing group associated with the second user; transmit the modified first computing group for display on the first user interface associated with the first computing device associated with the first user; receive, from the first computing device associated with the first user, a third selection, wherein the third selection comprises the second computing group associated with the second user; transmit the second computing group for display on the first user interface associated with the first computing device associated with the first user, wherein the second computing group comprises the second user and a fourth user, wherein the structural option associated with the first computing group remains visible on the first user interface; receive, from the first computing device associated with the first user, a fourth selection, wherein the fourth selection comprises the fourth user; receive, from the first computing device associated with the first user, a fifth selection, wherein the fifth selection comprises a message option; generate, based on the fourth selection and the fifth selection, a message object, wherein the message object is associated with the fourth user, and wherein the message object is associated with a first criteria associated with the fourth user; transmit the message object for display on the first user interface associated with the first computing device associated with the first user; receive, from the first computing device associated with the first user, a first input, wherein the first input is associated with the message object; and receive, from the first computing device associated with the first user, a sixth selection, wherein the sixth selection comprises a send option.

In some embodiments, the first criteria comprises at least one of: an overdue criteria, a due soon criteria, or a due later criteria.

According to other embodiment, the message object is associated with at least two criteria.

In some cases, the fourth selection comprises a select all option.

According to yet another embodiment, a method for selectively providing access to and communicating with a computing group associated with a user comprises: determining, using one or more computing device processors, a first user accesses a first system; receiving, using the one or more computing device processors, from a first computing device associated with the first user, a first selection, wherein the first selection comprises a first computing group associated with the first user; transmitting, using the one or more computing device processors, the first computing group for display on a first user interface associated with the first computing device associated with the first user, wherein the first computing group comprises a second user and a third user; receiving, using the one or more computing device processors, from the first computing device associated with the first user, a second selection, wherein the second selection comprises a structural option associated with the first computing group; modifying, using the one or more computing device processors, based on the second selection, the first computing group associated with the first user, thereby generating a modified first computing group, wherein the modified first computing group comprises the third user and a second computing group associated with the second user; transmitting, using the one or more computing device processors, the modified first computing group for display on the first user interface associated with the first computing device associated with the first user; receiving, using the one or more computing device processors, from the first computing device associated with the first user, a third selection, wherein the third selection comprises the second computing group associated with the second user; transmitting, using the one or more computing device processors, the second computing group for display on the first user interface associated with the first computing device associated with the first user, wherein the second computing group comprises the second user and a fourth user; receiving, using the one or more computing device processors, from the first computing device associated with the first user, a fourth selection, wherein the fourth selection comprises the fourth user; receiving, using the one or more computing device processors, from the first computing device associated with the first user, a fifth selection, wherein the fifth selection comprises a message option; generating, using the one or more computing device processors, based on the fourth selection and the fifth selection, a message object, wherein the message object is based on or associated with a first criteria associated with the fourth user; transmitting, using the one or more computing device processors, the message object for display on the first user interface associated with the first computing device associated with the first user; receiving, using the one or more computing device processors, from the first computing device associated with the first user, a first input, wherein the first input is associated with the message object; and receiving, using the one or more computing device processors, from the first computing device associated with the first user, a sixth selection, wherein the sixth selection comprises a send option.

In some embodiments, the first user manages or oversees the second user and the third user.

In other embodiments, the second user manages or oversees the fourth user.

According to one embodiment, the method further comprises: receiving, using the one or more computing device processors, from the first computing device associated with the first user, an eighth selection, wherein the eighth selection comprises the second user; and transmitting, using the one or more computing device processors, based on the eighth selection, at least one criteria associated with the second user for display on the first user interface associated with the first computing device associated with the first user.

In another embodiment, the first input comprises at least one of: at least one recipient, a subject, or a message.

According to some embodiments, the method further comprises: determining, using the one or more computing device processors, the fourth user has completed the first criteria; and updating, based on the determining the fourth user has completed the first criteria, at least some data comprised in or associated with the second computing group.

In other embodiments, the first user is at a first position on a hierarchy and the second user is at a second position on the hierarchy, wherein the first position is higher than the second position, the third user is at a third position on the hierarchy, wherein the first position is higher than the third position, and the fourth user is at a fourth position on the hierarchy, wherein the second position is higher than the fourth position.

According to another embodiment, a system or a computer program product can include or execute the methods described above. These and other implementations may each optionally include one or more of the above features.

BRIEF DESCRIPTION OF THE DRAWINGS

The disclosure is illustrated by way of example, and not by way of limitation in the figures of the accompanying drawings in which like reference numerals are used to refer to similar elements. It is appreciated that various features may not be drawn to scale and the dimensions of various features may be arbitrarily increased or reduced for clarity of discussion. Further, some components may be omitted in certain figures for clarity of discussion.

FIGS. 3, 4, 5, 6, and 7 show example interfaces used to selectively provide access to and communicate with a computing group associated with a user.

Although similar reference numbers for the foregoing drawings may be used to refer to similar elements for convenience, it is appreciated that each of the various exemplary embodiments may be considered to be distinct variations. As used in this disclosure, the terms "embodiment," "example embodiment," "exemplary embodiment," "implementation," and the like do not necessarily refer to a single embodiment, although it may, and various example embodiments may be readily combined and interchanged, without departing from the scope or spirit of the present disclosure. Furthermore, the terminology used herein is for the purpose of describing example embodiments only, and are not intended to be limitations. In this respect, as used herein, the term "in" may include "in" and "on," and the terms "a," "an" and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

DETAILED DESCRIPTION

Reference will now be made to various embodiments, examples of which are illustrated in the accompanying drawings and figures. In the following detailed description, numerous specific details are set forth in order to provide a thorough understanding of this disclosure. However, it will be apparent to one of ordinary skill in the art that the disclosure may be practiced without these specific details. In some instances, well-known methods, processes, components, systems, and networks have not been described in detail so as not to unnecessarily obscure aspects of the disclosed embodiments.

Network Environment

Figure 1A:
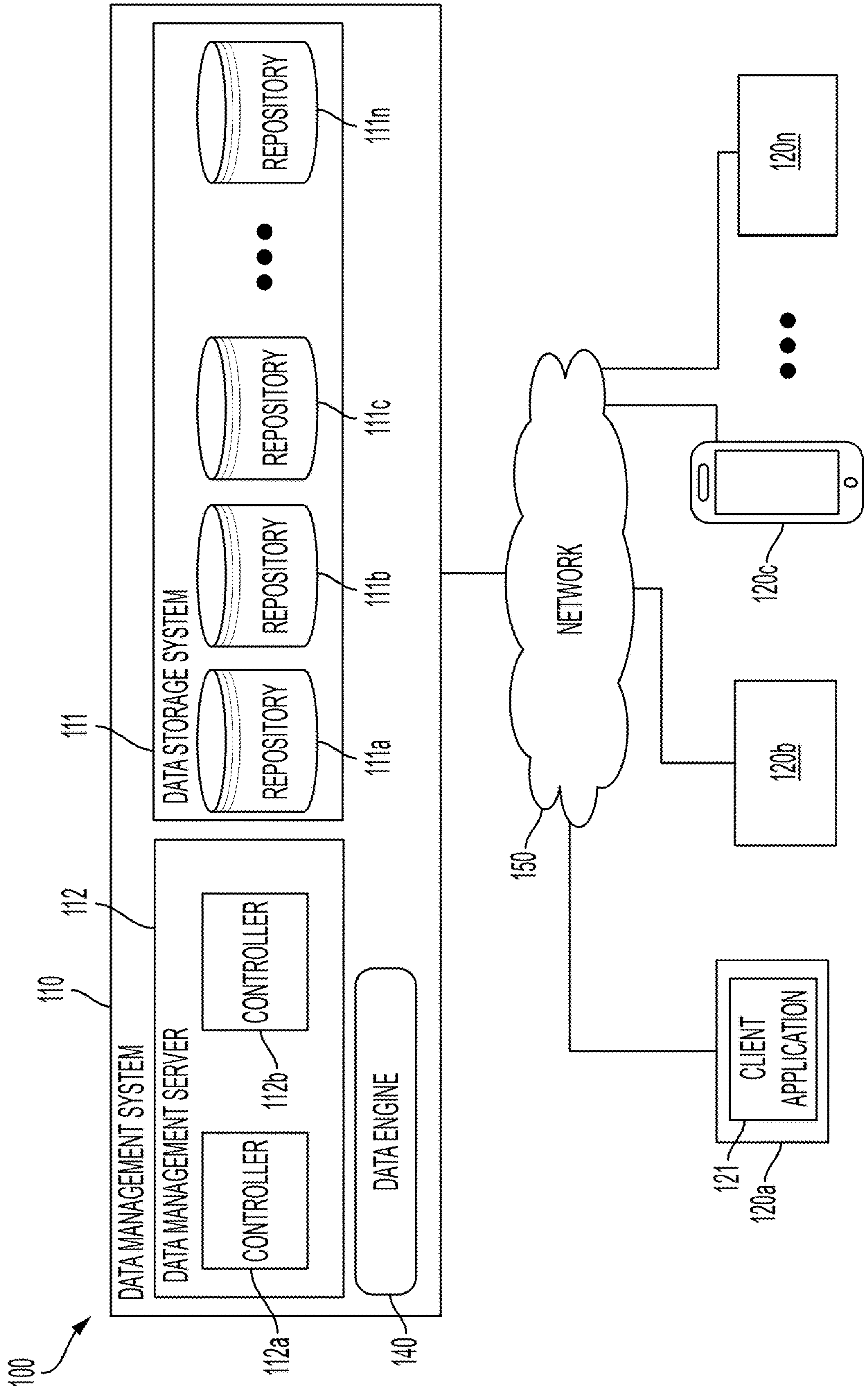
FIG. 1A illustrates an exemplary secure storage network within which the present technology may be implemented, according to some embodiments of this disclosure.

FIG. 1A illustrates an exemplary secure storage network 100 within which the present technology may be implemented. As shown, the secure storage network 100 may include a data management system 110 (also referred to as a secure storage system 110 elsewhere herein), and a plurality of user computing devices 120*a*, 120*b*, . . . 120*n* coupled to each other via a network 150.

The data management system 110 may include a data storage system 111 and a data management server 112. The data storage system 111 may have one or more secure repositories 111*a*, 111*b*, 111*c*, . . . 111*n*. Each of the one or more secure repositories 111*a*, 111*b*, 111*c*, . . . 111*n* may comprise two or more secure storage structures configured to store, at least index data, and/or file data, and/or record data, and/or matrix data, and/or computing group data, and/or criteria data, and/or user data as the case may require. According to one embodiment, the index data, and/or file data, and/or record data, and/or matrix data, and/or computing group data, and/or criteria data, and/or user data may be associated with a medical facility, a research facility, a governmental agency, an educational institution, etc. In some cases, the data storage system 111 comprises secure data structures, and/or computing storage structures that securely store data indices, files associated with said data indices, and/or records associated with said data indices, and/or computing data matrices, and/or computing groups.

The network 150 may include one or more types of communication networks such as a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120*a*, . . . 120*n* may be any machine or system that is used by a user to access the data management system 110 via the network 150, and may comprise computing devices including laptop computers, desktop computers, mobile phones, smart phones, tablet computers, and netbooks. A client application 121 (e.g., a secure interface) associated with the data management system 110 may be run from a user computing device (e.g., 120*a*) to securely access data in the data management system 110 via the network 150.

The data storage system 111 may store data that client applications (e.g., client application 121) in user computing devices 120*a* . . . 120*n* may access. Furthermore, the data storage system 111 may comprise any commercially available storage devices.

According to one embodiment, each content repository (e.g., 111*a*, 111*b*, 111*c*, . . . or 111*n*) may store one or more data categories such that one or more users may be provided access to the one or more data categories based on context data associated with the one or more users and/or context data associated with the one or more data categories.

It is appreciated that the disclosed content repositories 111*a*, 111*b*, 111*c*, . . . 111*n* may comprise separate logic sections in the same storage device. According to one embodiment, content data stored in the content repositories 111*a*, 111*b*, 111*c*, . . . 111*n* may comprise controlled content stored in specialized databases including at least one source of truth database within said repositories such that specific users and/or specific computing devices may be provided credential access to said repositories based on one or more profiles of the specific users and/or specific devices previously stored or otherwise associated with the data management system 110.

According to one embodiment, each of the content repositories 111*a*, 111*b*, 111*c*, . . . 111*n* can be implemented as one or more computer-readable or machine-readable storage media that are non-transitory. In some embodiments, the content repositories 111*a*, 111*b*, 111*c*, . . . 111*n* may be distributed within and/or across multiple internal and/or external enclosures of a computing system and/or additional computing systems. Furthermore, each of the content repositories 111*a*, 111*b*, 111*c*, . . . 111*n* may comprise one or more similar or dissimilar forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks; optical media such as compact disks (CDs) or digital video disks (DVDs), BluRays or other types of optical media; or other types of storage devices.

The data management server 112 may comprise a remote computer system accessible over a remote or local network, such as the network 150. The data management server 112 may store a data management controller 112*a* and a data collection controller 112*b* for controlling management and collection of the data. The data management server 112 could be any commercially available computing devices. Although only one server is shown, it is appreciated that the data management system 110 may have a plurality of servers such that the controllers 112*a* and 112*b* may be in separate servers. A client application (e.g., client application 121) may be active on one or more user computing devices 120*a*, . . . , 120*n*. The corresponding server application may be active on the data management server 112. The client application and the corresponding server application may communicate with each other over the network 150 and thereby provide distributed functionality and allow multiple client applications to take advantage of the information-gathering capabilities of the data management system 110.

Figure 2:
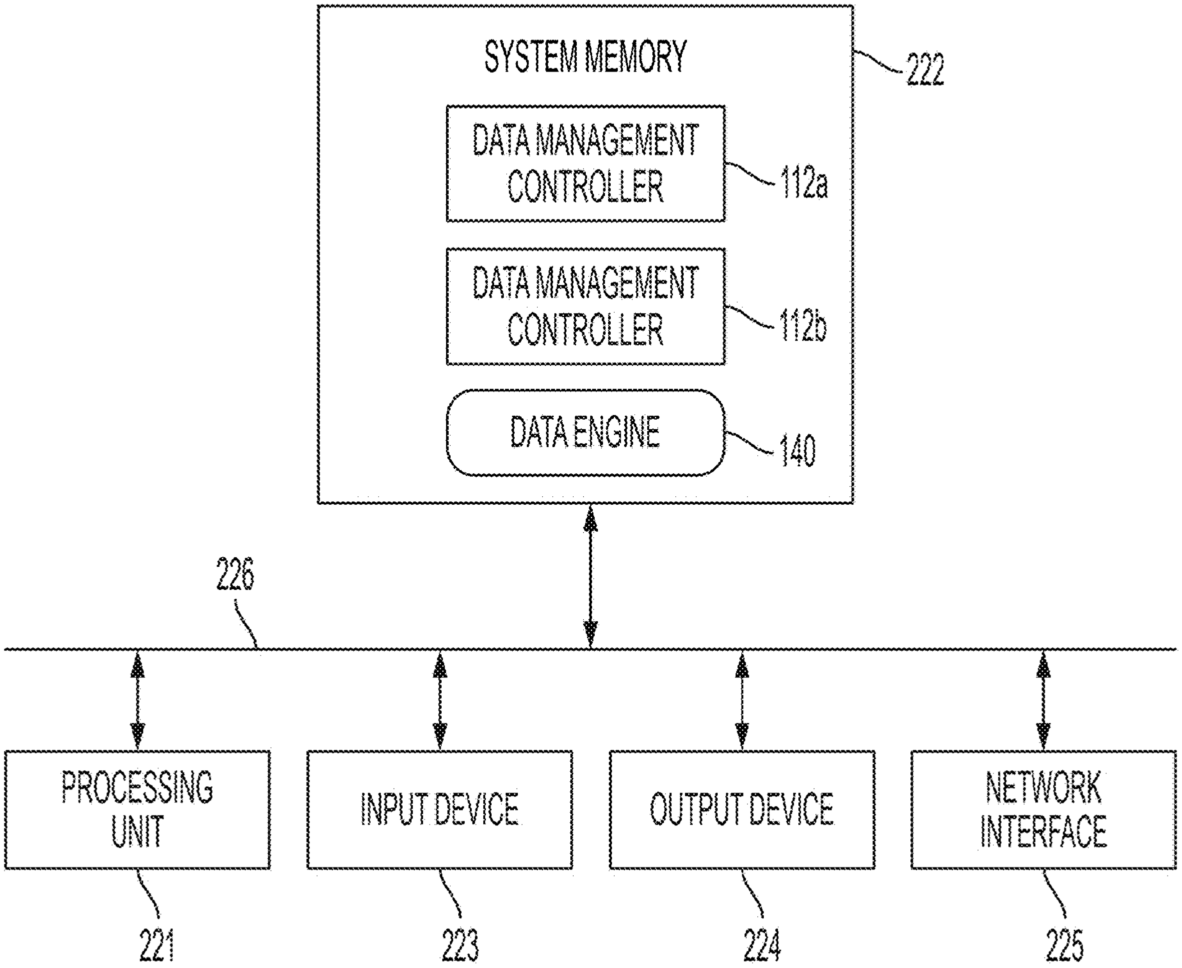
FIG. 2 illustrates an example high level block diagram of the data management system of FIG. 1A, according to some embodiments of this disclosure.

The data engine 140 shown within the data management system 110 may include instructions stored in a system memory (e.g., memory 222 of FIG. 2) that are executed by one or more computing device processors (e.g., processing unit 221 of FIG. 2). The instructions may include various operations or processes discussed below in association with, for example, one or more task protocols, and/or one or more data routing computing operations, and/or one or more data correlation or data relation computing operations.

In one embodiment, the secure storage network 100 may be used for collecting and managing data (e.g., user data, computing matrix data, computing group data, criteria data, index data, file data, record data, file or record data associated with a trial, file or record data associated with a research, medical file or record data, etc.). For example, a first repository (e.g., repository 111*a*) of the secure storage network 100 may store electronic records or electronic files or index data or user data or computing matrix data or computing group data or criteria data as the case may require. In some cases, the electronic records comprise electronic data capture (EDC) data and/or trial source data (e.g., associated with a subject), and/or medical inquiry data, and/or quality control data, and/or safety data, etc. It is appreciated that a trial as described in this disclosure may refer to a clinical trial.

The data management system 110 may have: one or more interfaces for receiving the plurality of data described herein; database or query mechanisms for operating on the plurality of data; and one or more reporting tools for analysis of the plurality of data.

Furthermore, each of the content repositories 111*a*, 111*b*, 111*c*, . . . or 111*n* may be used by a plurality of sites (e.g., a hospital site, a school site, a research site, a pharmaceutical company site, etc.) to store the plurality of data provided in this disclosure. In one embodiment, the plurality of data comprises source data (e.g., vital statistics data such as blood pressure values, research results values, chemical analysis values, biographic data, bibliographic data, demographic data, test data, etc.) which may be converted to EDC data automatically, and then stored in one or more of the content repositories 111*a*, 111*b*, 111*c*, . . . or 111*n*. It is appreciated that the EDC data stored in the various content repositories 111*a*, 111*b*, 111*c*, . . . or 111*n* may be synchronized to ensure that data inconsistencies do not creep into any of the content repositories 111*a*, 111*b*, 111*c*, . . . or 111*n*. It is further appreciated that each of the content repositories 111*a*, 111*b*, 111*c*, . . . or 111*n* may have two or more data storage structures.

In one embodiment, the data management system 110 may comprise a multi-tenant system where various elements of hardware and software are shared by one or more users. For instance, the data management server 110 may simultaneously and securely process requests from a plurality of users, and the data storage system 111 may securely store controlled or secure content for the plurality of users.

In one embodiment, the data management system 110 may run on a cloud computing platform. Users of said cloud computing platform can access the controlled content comprised in the cloud computing platform independently by using, for example, a virtual machine image, or acquiring access to a service maintained by a cloud database provider associated with the secure storage network 100. In one embodiment, the data management system 110 may be provided as Software as a Service ("SaaS") to allow users to access the data management system 110 with, for example, a thin client.

Figure 1B:
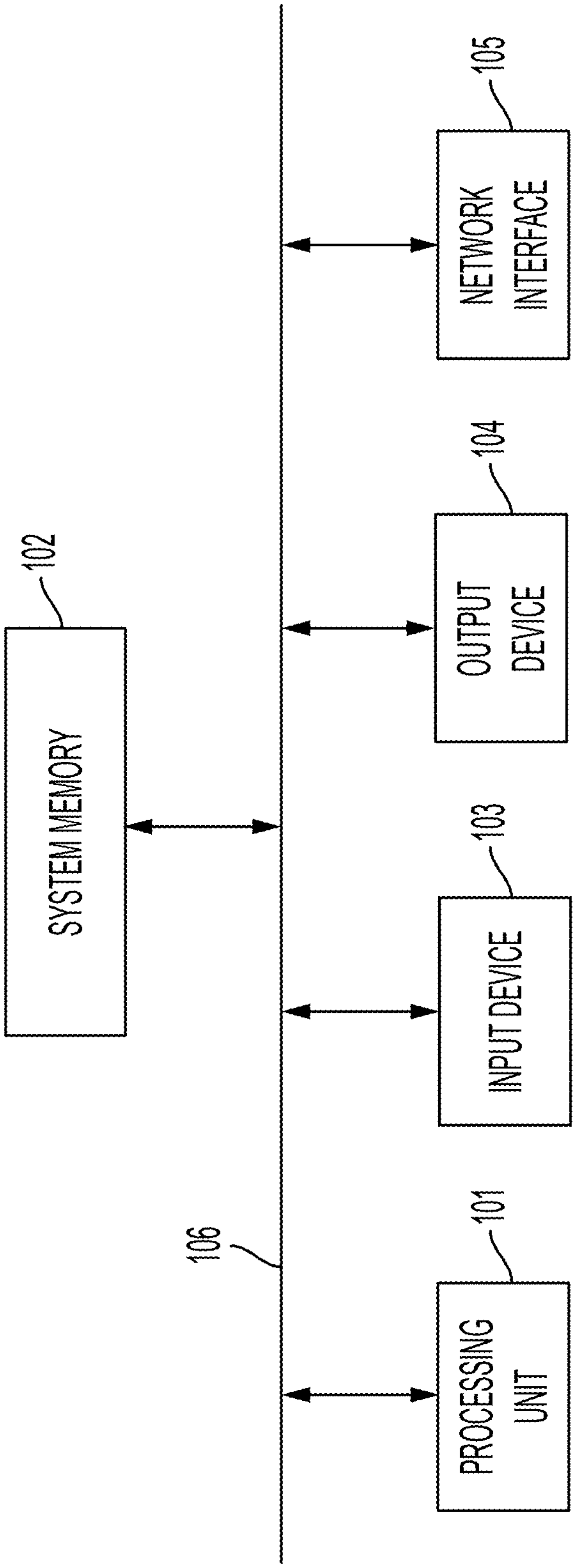
FIG. 1B illustrates an example block diagram of a computing device within which one or more systems or devices of FIG. 1A can be implemented, according to some embodiments of this disclosure.

FIG. 1B illustrates an example block diagram of a computing device which can be used as the computing devices 120*a*, . . . , 120*n*, and the data management system 110 of FIG. 1A. The illustrated computing device is only one example of a suitable computing environment and is not intended to suggest any limitation as to scope of use or functionality. The computing device of FIG. 1B may include a processing unit 101, a system memory 102, an input device 103, an output device 104, a network interface 105, and a system bus 106 that couples these components to each other.

The processing unit 101 may be configured to execute computer instructions or computing operations that are stored in a computer-readable medium, for example, the system memory 102. The processing unit 101 may comprise a central processing unit (CPU).

The system memory 102 can include a variety of computer readable media which may be any available media accessible by the processing unit 101. For instance, the system memory 102 may include computer storage media in the form of volatile and/or non-volatile memory such as read only memory (ROM) and/or random-access memory (RAM). By way of example, but not limitation, the system memory 102 may store instructions and data including an operating system, program sub-systems, various application programs, and program data.

A user can enter computing commands and/or information to the computing device of FIG. 1B through the input device 103. The input device 103 may comprise a keyboard, a touchscreen input device, a touch pad, a mouse, a microphone, and/or an electronic pen and/or some other input computing device.

The computing device of FIG. 1B may provide output data via the output device 104 which may comprise a monitor, a display device (e.g., a display screen of a tablet, cell phone, etc.), a speaker, a printer, or some other output computing device.

The computing device of FIG. 1B, through the network interface 105, may operate in a networked or distributed environment using logical connections to one or more other computing devices, which may be a personal computer (PC), a server, a router, a network PC, a peer device, a smart phone, or any other media consumption or transmission computing device, and may include any or all of the elements described above. The logical connections may include a network (e.g., the network 150) and/or buses. The network interface 105 may be configured to allow the computing device of FIG. 1B to transmit and receive data in a network, for example, the network 150. The network interface 105 may include one or more network interface cards (NICs). It is appreciated that the computing device of FIG. 1B could comprise a stationary computing device or a mobile computing device.

FIG. 2 illustrates an example high level block diagram of the data management server 112 according to one embodiment of the present disclosure. The data management server 112 may be implemented by the computing device such as the computing device of FIG. 1B, and may have a processing unit 221, a system memory 222, an input device 223, an output device 224, and a network interface 225, coupled to each other via a system bus 226.

The system memory 222 may comprise data management controllers 112*a* and 112*b*. In one embodiment, the data management controllers 112*a* and 112*b* may be comprised in one or more applications including a web application or a Java application. In addition, the data management controllers 112*a* and 112*b* may be configured to receive and/or store the plurality of data disclosed.

The system memory 222 may also include a data engine 140 or one or more data engines 140 stored in one or more memory devices comprised in the system memory 222 and which cause one or more computing device processors to execute the various processing stages of FIGS. 8A and 8B as further discussed below. For example, the flowchart of FIGS. 8A and 8B may be executed using the data engine 140 or a data processing module (e.g., computing module) stored in memory 222 such that the data engine 140 includes instructions that are executed by one or more processing units 221 to implement at least the flowchart of FIGS. 8A and 8B.

Exemplary Interfaces

FIGS. 3-7 show example user interfaces that selectively provide access to and communicate with a computing group associated with a user.

Figure 3:
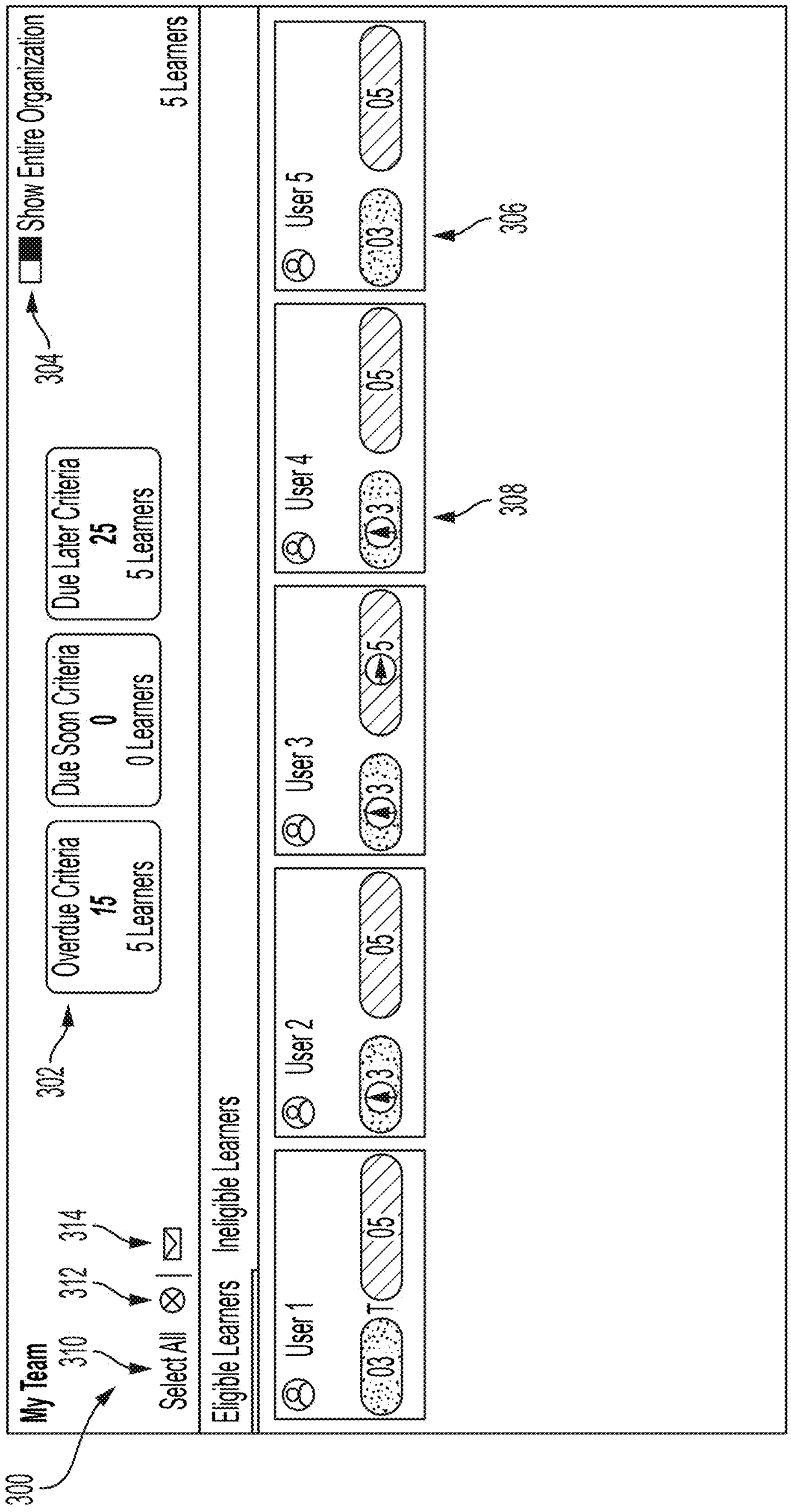

FIG. 3 shows an example first computing group user interface 300 for a first user within a system that selectively provides access to and communicates with a computing group associated with a user. The first computing group user interface 300 may comprise at least one of: at least one criteria indicator 302, a computing group modifier 304, at least one user comprised in the first computing group, and at least one option associated with the first computing group. In one embodiment, the first computing group user interface 300 may further comprise an indicator associated with the at least one user comprised in the first computing group (e.g., "5 Learners" in FIG. 3). The at least one criteria indicator 302 may comprise an overdue criteria indicator, a due soon criteria indicator, and a due later criteria indicator. In one embodiment, the overdue criteria indicator may comprise a number of overdue criteria and a number of users (e.g., users that report to the first user) to which the number of overdue criteria are assigned. In some cases, the overdue criteria are criteria that were due in the past (e.g., due yesterday, due a week ago, due a month ago, etc.).

In some cases, the at least one criteria indicator 302 may be selected by the first user. According to one embodiment, selecting the overdue criteria indicator may modify (e.g., filter) the first computing group to only display users within the first computing group that have overdue criteria. In another embodiment, selecting the due soon criteria indicator may modify (e.g., filter) the first computing group to only display users within the first computing group that have due soon criteria. According to yet another embodiment, selecting the due later criteria indicator may modify (e.g., filter) the first computing group to display users within the first computing group that have due later criteria.

According to another embodiment, the due soon criteria indicator may comprise a number of criteria that are due soon and a number of users (e.g., users that are managed by the first user) to which the number of criteria that are due soon are assigned. In other cases, the due soon criteria are criteria that are due in the near future (e.g., due today, due in a day, due in three days, due in a week, etc.). In yet another embodiment, the due later criteria indicator may comprise a number of criteria that are due later and a number of users (e.g., users that report directly to the first user, users that report directly or indirectly to the first user) to which the number of criteria that are due later are assigned. In still other cases, the due later criteria are criteria that are due in the later future (e.g., due in a week, due in ten days, due two weeks, due in a month, etc.). The range of values for due soon criteria and due later criteria may be preset within the system, set by a user, received by a user, etc. In some embodiments, a criteria may comprise an assignment, a training, a document, a link, etc.

The computing group modifier 304 may be selected (e.g., toggled) by the first user. According to some embodiments, selecting the computing group modifier displays a modified first computing group (e.g., the modified first computing group user interface 400 of FIG. 4). The at least one user comprised in the first computing group may, according to one embodiment, comprise a second user 306 and a third user 308. In some embodiments, the first computing group comprises users that report directly to the first user. Furthermore, in some embodiments, the modified first computing group comprises users that report both directly and indirectly to the first user. For example, if the second user reports to the first user, and a fourth user reports to the second user, then the fourth user will be comprised in the modified first computing group, but not in the first computing group. According to some embodiments, selecting the second user 306 may display a criteria page associated with the second user (e.g., the criteria user interface 700 of FIG. 7). In another embodiment, selecting the second user 306 may enable the first user to send a message (e.g., a reminder to complete the criteria) to the second user (e.g., the user interface 500 of FIG. 5). In some cases, selecting the computing group modifier modifies the at least one criteria indicator 302. For example, the at least one criteria indicator 302 may change from displaying criteria data associated with direct reports of the first user to displaying criteria data associated with both direct and indirect reports of the first user.

According to one embodiment, the at least one user comprised in the first computing group may be sorted into groups (e.g., eligible users vs. ineligible users, active users vs. inactive users, etc.). In some cases, the at least one option associated with the first computing group comprise a select all option 310, a cancel option 312, and a message option 314. The select all option 310 may be selected by the first user. According to one embodiment, selecting the select all option 310 may result in the at least one user comprised in the first computing group to be selected. Upon selecting a user (e.g., the second user, the third user, a fourth user, etc.) or users and/or upon selecting the select all option 310, the first user may select the message option 314. In another embodiment, selecting the message option 314 may result in display of a message box (e.g., the messaging user interface 600 of FIG. 6). The first user may select the cancel option 312. In yet another embodiment, selecting the cancel option 312 may deselect any currently selected users.

Figure 4:
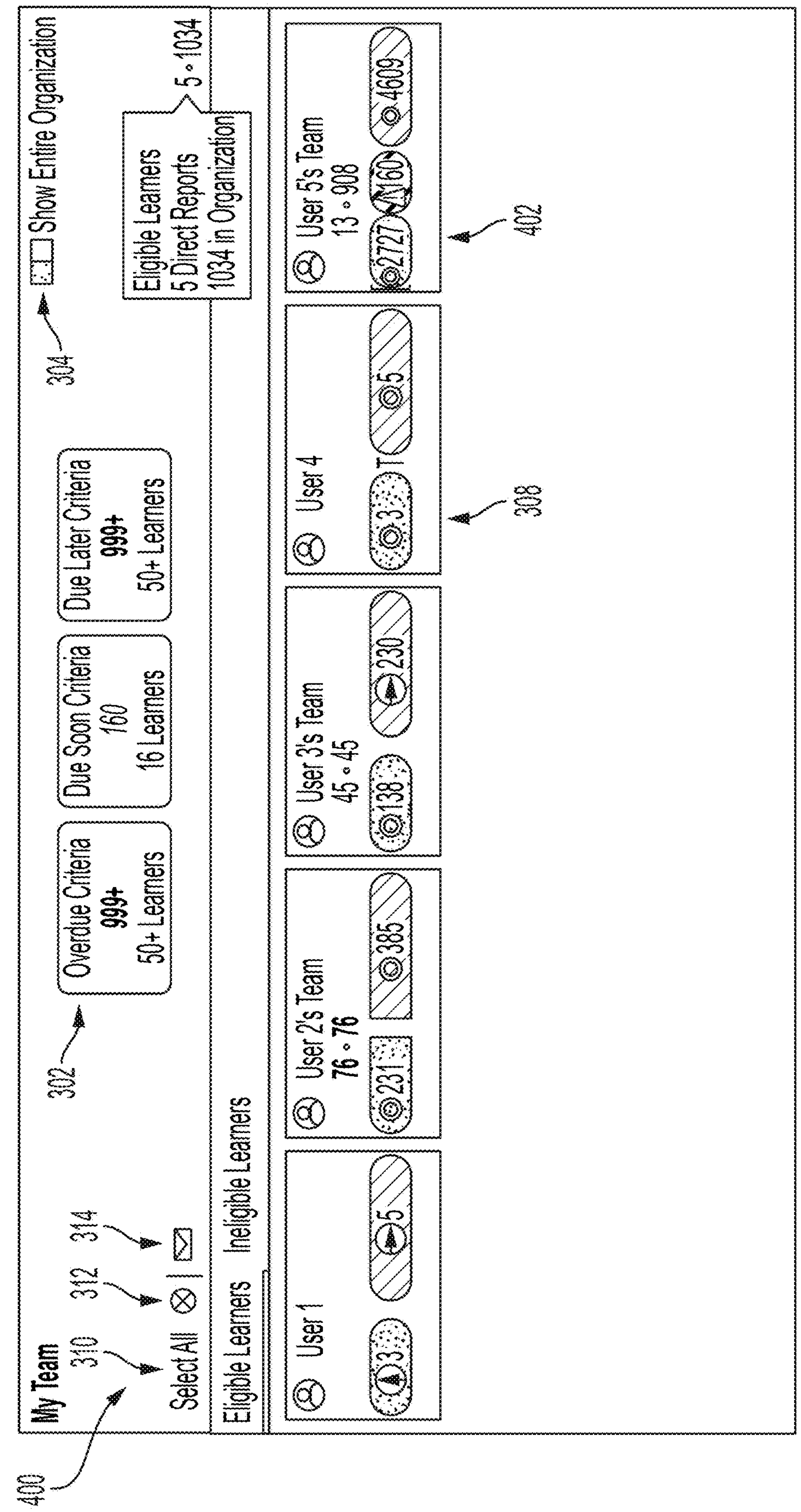

FIG. 4 shows an example modified first computing group user interface 400 for a first user within a system that selectively provides access to and communicates with a computing group associated with a user. The modified first computing group user interface 400 may comprise at least one of: the at least one criteria indicator 302, the computing group modifier 304, at least one user comprised in the modified first computing group, and the at least one option associated with the modified first computing group. In one embodiment, the modified first computing group user interface 400 may further comprise an indicator associated with the at least one user comprised in the modified first computing group (e.g., “5 ● 1034” in FIG. 4). Furthermore, in some cases, the first user may hover over and/or select the indicator for further information. In another embodiment, the at least one user comprised in the modified first computing group comprises the at least one user comprised in the first computing group. Furthermore, in some embodiments, the at least one user comprised in the modified first computing group comprises at least one user reporting to a given user within the at least one user comprised in the first computing group. The at least one criteria indicator 302 may update based on a position of the first user within a hierarchy (e.g., the at least one criteria indicator will only reflect users at or below the position within the hierarchy). For example, the at least one criteria indicator 302 may update once the first user has selected another computing group (e.g., the second computing group) to display criteria data associated with the selected computing group.

According to some embodiments, the modified first computing group may comprise the third user 308 and a second computing group 402 associated with the second user 306. In one embodiment, the second computing group 402 may comprise the second user and a fourth user. In some embodiments, the second computing group 402 may further comprise at least one computing group and/or at least two users. The first user may select the second computing group 402. According to some embodiments, selecting the second computing group 402 may display a second computing group user interface (e.g., the second computing group user interface 500 of FIG. 5) associated with the second computing group. In another embodiment, selecting the second computing group 402 may enable the first user to send a message (e.g., a reminder to complete the criteria) to the at least one user comprised in the modified first computing group. According to one embodiment, the at least one user comprised in the modified first computing group may be sorted into groups (e.g., eligible users vs. ineligible users, active users vs. inactive users, etc.). In some embodiments, a user may be tagged as an eligible learner or an ineligible learner. An eligible learner, in some cases, can be assigned criteria to complete. In other cases, an ineligible learner cannot be assigned criteria to complete.

Figure 5:
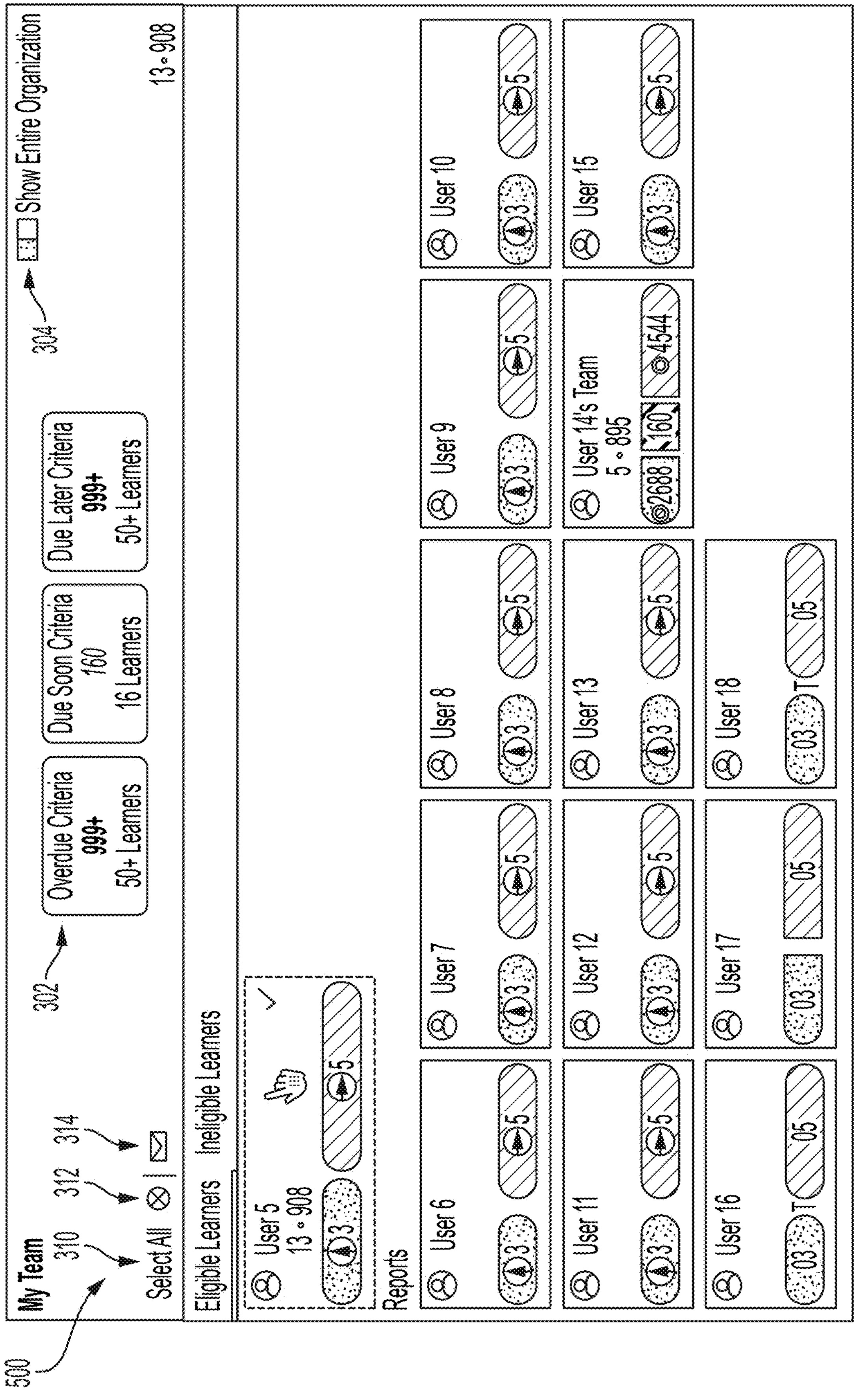

FIG. 5 shows an example second computing group user interface 500 for a first user within a system that selectively provides access to and communicates with a computing group associated with a user The second computing group user interface 500 may comprise at least one of: the at least one criteria indicator 302, the computing group modifier 304, at least one user comprised in the second computing group, and the at least one option associated with the second computing group. In one embodiment, the second computing group user interface 500 may further comprise an indicator associated with the at least one user comprised in the second computing group (e.g., “13 ● 908” in FIG. 5). Furthermore, in some cases, the first user may hover over and/or select the indicator for further information associated with the breakdown of the at least one user comprised in the second computing group (e.g., direct reports vs. indirect reports).

In some embodiments, selecting the computing group modifier 304 may result in only users being visible. In other embodiments, selecting the computing group modifier 304 may result in both users and computing groups being visible. The at least one user comprised in the second computing group may, in one embodiment, comprise the second user and the fourth user. According to another embodiment, the at least one user comprised in the second computing group may further comprise at least one computing group and/or at least three users. In yet another embodiment, the at least one user comprised in the second computing group may be sorted into groups (e.g., eligible users vs. ineligible users, active users vs. inactive users, etc.).

Figure 6:
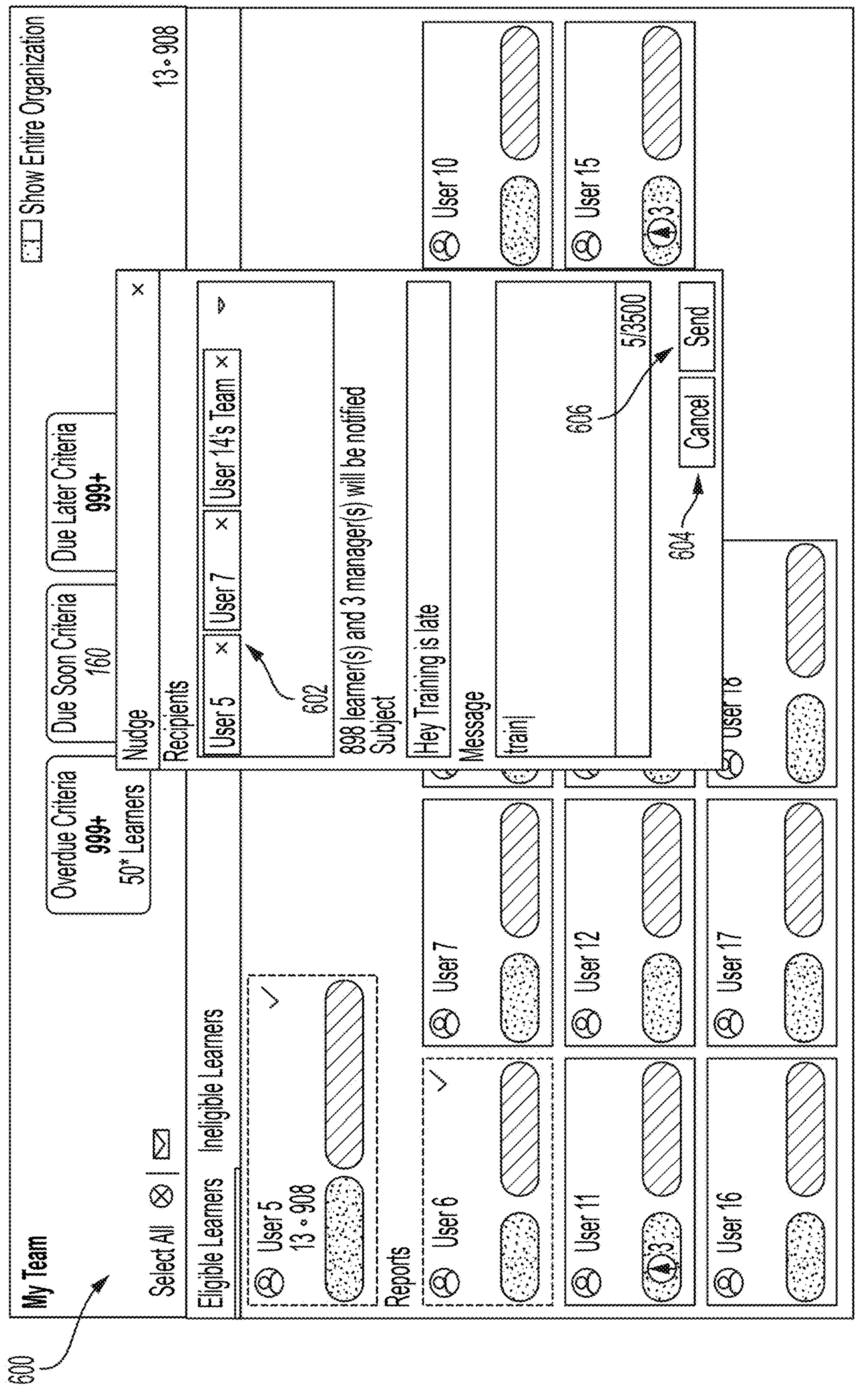

FIG. 6 shows an example messaging user interface 600 for a first user within a system that selectively provides access to and communicates with a computing group associated with a user. The messaging user interface 600 may comprise at least one of: at least one recipient 602, a subject, a message, a cancel option 604 and a send option 606. In some embodiments, the at least one recipient 602 was previously selected from a computing group (e.g., the first computing group, the modified first computing group, the second computing group, etc.). According to one embodiment, the user may add an additional recipient to the at least one recipient 602 upon selecting the at least one recipient. In some cases, the additional recipient may be searched for within the computing group (e.g., typing the additional recipient's name, typing a partial match to the additional recipient name, etc.). In other cases, the additional recipient may be selected from a menu (e.g., a dropdown menu with all users within the computing group). According to some embodiments, the first user may remove a first recipient comprised in the at least one recipient by selecting the first recipient. In other embodiments, the at least one recipient 602 may further comprise an indicator that describes the at least one recipient 602 (e.g., “898 learner(s) and 3 manager (s) will be notified” in FIG. 6)

In one embodiment, the first user may select the subject. Upon selection, the subject may, in some embodiments, prompt the first user for a first input. The subject may comprise text (e.g., numbers, letters, words, emoticons, etc.) associated with the message. In some embodiments, the subject may be a short or general summary of the message. According to one embodiment, the subject may be left blank. The first user may select the message. Upon selection, the message may, in other embodiments, prompt the first user for a second input. The message and/or the subject may comprise text received from the first user. According to another embodiment, the message may be left blank (e.g., no input from the first user is required).

The first user may select the cancel option 604. In some embodiments, selecting the cancel option returns the first user to a computing group user interface (e.g., the first computing group user interface 300 of FIG. 3, the modified first computing group user interface 400 of FIG. 4, the second computing group user interface 500 of FIG. 5, etc.). The first user may select the send option 606. In other embodiments, selecting the send option 606 results in the at least one recipient receiving a notification associated with the subject and/or the message. Furthermore, in some cases, the notification is further associated with at least one criteria (e.g., an assignment) associated with the at least one recipient. According to one embodiment, selecting the send option 606 results in the at least one recipient being reminded to complete at least one criteria.

FIG. 7 shows an example criteria user interface 700 for a first user within a system that selectively provides access to and communicates with a computing group associated with a user. The criteria user interface 700 may comprise at least one criteria 702 associated with the first user. In some embodiments, a first criteria comprised in the at least one criteria 702 may comprise at least one of: a name, an assigned date, a due date, an indicator of overdue days, a criteria type, a state, a role, a curriculum, or a source. According to one embodiment, the at least one criteria may be sorted via the assigned date and/or the due date and/or the name (e.g., alphabetically). In another embodiment, the first user may filter the at least one criteria 702 by at least one of: the name, the assigned date, the due date, the indicator of overdue days, the criteria type, the state, the role, the curriculum, or the source. Any date (e.g., a due date, an assigned date, a last updated date, etc.) within this disclosure may comprise at least one of: a day, a month, a year, a time, an hour, a minute, a second, etc.

The state, in some embodiments, may comprise a lifecycle state (e.g., assigned, completed, pending, canceled, etc.). According to other embodiments, the role and/or the curriculum may comprise or be associated with a discipline or an industry. In yet other embodiments, the source may comprise or be associated with a creator and/or an assignor of the criteria (e.g., the system, a user within the system, etc.). In some embodiments, the at least one criteria 702 may be sorted into groups (e.g., separated based on their status). For example, the groups may comprise at least one of: all criteria, open criteria, completed criteria, etc. According to one embodiment, the criteria user interface 700 may further comprise a link to a computing data matrix. The computing data matrix, in some embodiments, may display the at least one criteria associated with (e.g., matched with) at least one function or role associated with the first user. In one embodiment, the computing data matrix may comprise at least one of: a table, a linked list, a customizable data structure, a standard data structure, a database, etc. Furthermore, in some cases, the first user may access and/or edit the computing data matrix (e.g., assign a criteria to a user, unassign a criteria from a user, etc.).

It is appreciated that tags may be used to determine and maintain a hierarchy of users within a system that selectively provides access to and communicates with a computing group associated with a user. For example, in some embodiments, a first level of the hierarchy may be associated with a first tag, a second level of the hierarchy may be associated with a second tag, etc. According to one embodiment, the tags may be used in assigning criteria to users (e.g., all users with a first tag are assigned a criteria). In another embodiment, the tags may be used in determining (e.g., in real-time or substantially real-time) the at least one criteria indicator 302. According to yet another embodiment, the tags may be used in determining which users a given user reports to and/or which users report to a given user.

Exemplary Flowcharts

Figure 8A:
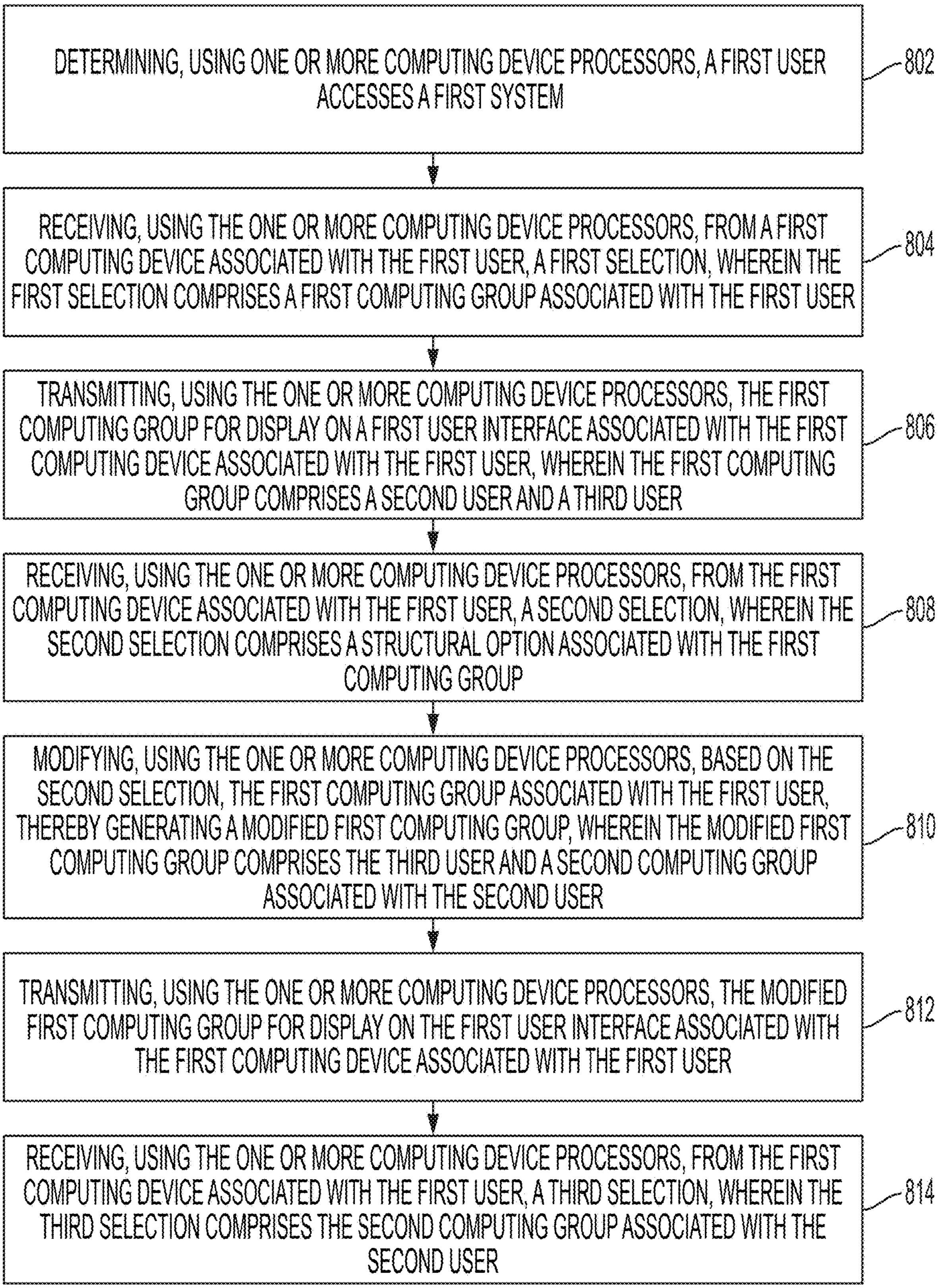
FIGS. 8A and 8B show an exemplary workflow for selectively providing access to and communicating with a computing group associated with a user.
Figure 8B:
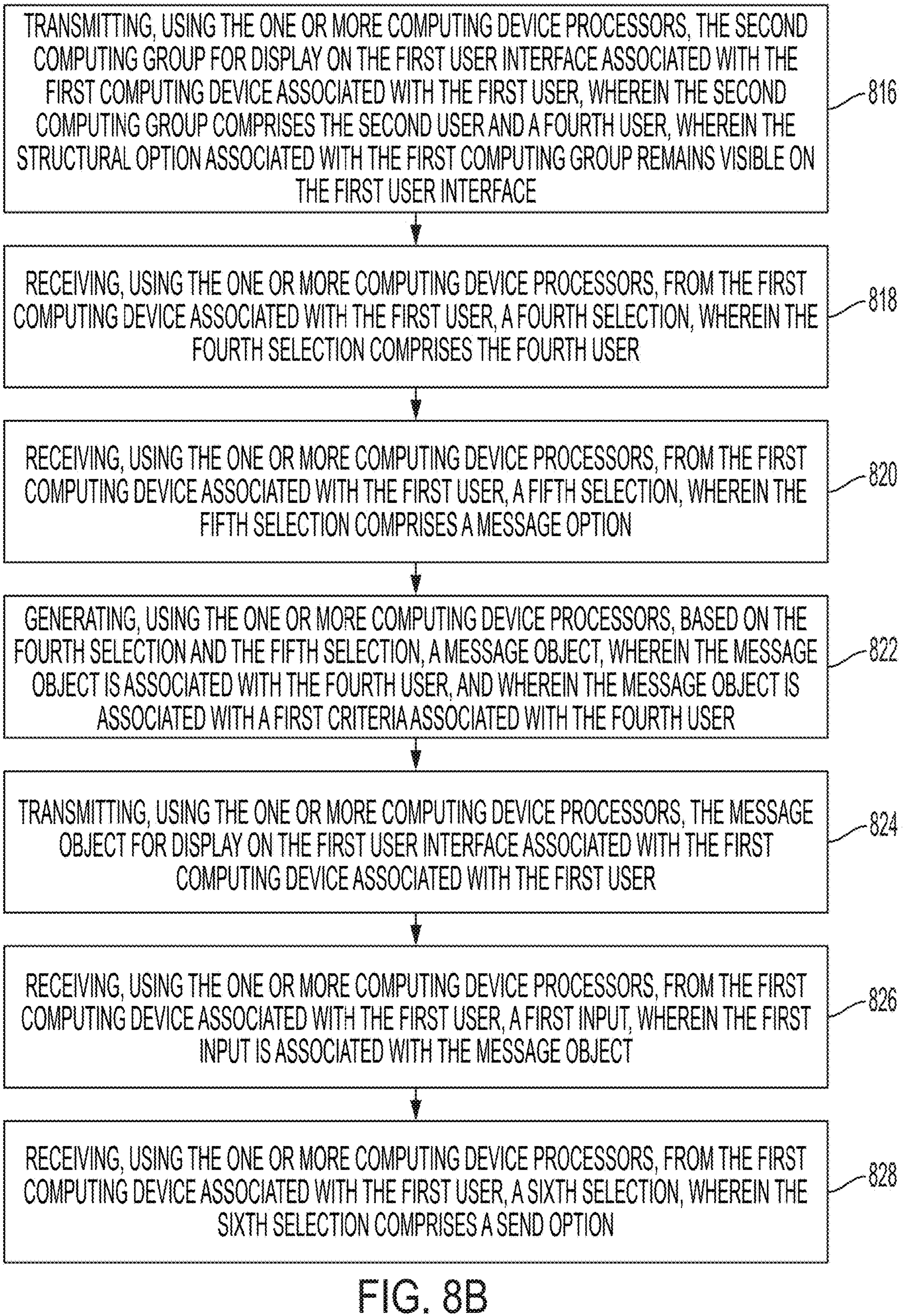

FIGS. 8A and 8B show an exemplary workflow for selectively providing access to and communicating with a computing group associated with a user. The various blocks of FIGS. 8A and 8B may be executed in a different order from that shown in FIGS. 8A and 8B. Some blocks may be optional. It is appreciated that one or more data engines stored in one or more memory devices may cause one or more computing device processors to execute the various processing stages of the workflow of FIGS. 8A and 8B. For example, the disclosed techniques may be implemented as one or more data engines comprised in a secure storage network that is optimized to store and/or process data associated with a plurality of users or computing models.

At block 802, the one or more data engines may determine, using one or more computing device processors, a first user accesses a first system. In some embodiments, the first user comprises an administrative user and/or a manager. According to one embodiment, the first user may have more permissions than a standard user. For example, the first user may be enabled to modify and/or transform and/or create and/or delete and/or transmit data within the first system. Furthermore, the first user may be enabled to set and/or edit settings associated with the first system.

Turning to block 804, the one or more data engines may receive, using the one or more computing device processors, from a first computing device associated with the first user, a first selection, wherein the first selection comprises a first computing group associated with the first user. In some embodiments, the first computing group associated with the first user comprises users that report to the first user. According to one embodiment, the first computing group may comprise at least one user. At block 806, the one or more data engines may transmit, using the one or more computing device processors, the first computing group for display on a first user interface associated with the first computing device associated with the first user, wherein the first computing group comprises a second user and a third user. In one embodiment, the second user and/or the third user may be associated with a computing group (e.g., a second computing group, a third computing group, etc.). According to some embodiments, the second user and the third user are managed by the first user.

At block 808, the one or more data engines may receive, using the one or more computing device processors, from the first computing device associated with the first user, a second selection, wherein the second selection comprises a structural option associated with the first computing group. In some embodiments, the structural option comprises a computing group modifier option, an organizational option, etc. In some cases, the second selection comprises a click, a tap, a swipe, etc. At block 810, the one or more data engines may be used to modify, using the one or more computing device processors, based on the second selection, the first computing group associated with the first user, thereby generating a modified first computing group, wherein the modified first computing group comprises the third user and a second computing group associated with the second user. In some embodiments, the second computing group comprises at least two users. In other embodiments, the second computing group comprises at least one computing group.

At block 812, the one or more data engines may transmit, using the one or more computing device processors, the modified first computing group for display on the first user interface associated with the first computing device associated with the first user. At block 814, the one or more data engines may receive, using the one or more computing device processors, from the first computing device associated with the first user, a third selection, wherein the third selection comprises the second computing group associated with the second user. In some embodiments, third selection may comprise a click, a tap, a double click, etc.

Turning to FIG. 8B, the one or more data engines may, at block 816, transmit, using the one or more computing device processors, the second computing group for display on the first user interface associated with the first computing device associated with the first user, wherein the second computing group comprises the second user and a fourth user, wherein the structural option associated with the first computing group remains visible on the first user interface. According to one embodiment, the fourth user reports directly to the second user. In another embodiment, the fourth user reports indirectly to the first user. At block 818, the one or more data engines may receive, using the one or more computing device processors, from the first computing device associated with the first user, a fourth selection, wherein the fourth selection comprises the fourth user. The fourth selection, in some embodiments, may comprise a click, checking a checkbox, etc.

At block 820, the one or more data engines may receive, using the one or more computing device processors, from the first computing device associated with the first user, a fifth selection, wherein the fifth selection comprises a message option. According to some embodiments, the message option may comprise a nudge or a reminder associated with a criteria. At block 822, the one or more data engines may generate, using the one or more computing device processors, based on the fourth selection and the fifth selection, a message object, wherein the message object is associated with the fourth user, and wherein the message object is associated with a first criteria associated with the fourth user. In some cases, the message object further comprises at least one of: at least one recipient, a subject, and a message body. According to one embodiment, the fourth selection may further comprise at least one user and/or at least one computing group. In another embodiment, the at least one recipient may comprise at least one user and/or at least one computing group. In some embodiments, the first criteria comprises at least one of: an assignment, a file, a training, a document, a signature box, or a link. At block 824, the one or more data engines may transmit, using the one or more computing device processors, the message object for display on the first user interface associated with the first computing device associated with the first user.

The one or more data engines may, at block 826, receive, using the one or more computing device processors, from the first computing device associated with the first user, a first input, wherein the first input is associated with the message object. According to one embodiment, the first input may comprise or be associated with the at least one recipient, and/or the subject, and/or the message body. In some embodiments, the subject may be left blank. In other embodiments, subject may be provided by the first user via the first input. According to yet another embodiment, the message body may be left blank. According to still another embodiment, the message body may be provided by the first user via the first input. In some cases, the first user may, via the first input, add, and/or remove, and/or view a recipient comprised in the at least one recipient. At block 828, the one or more data engines may receive, using the one or more computing device processors, from the first computing device associated with the first user, a sixth selection, wherein the sixth selection comprises a send option.

In another embodiment, a system and a computer program product can include or execute the method described above. These and other implementations may each optionally include one or more of the following features.

According to some embodiments, the method may further comprise: determining, using the one or more computing device processors, the fourth user accesses the first system; transmitting, using the one or more computing device processors, based on the sixth selection, the first input for display on a second user interface associated with a second computing device associated with the fourth user; receiving, using the one or more computing device processors, from the second computing device associated with the fourth user, a seventh selection, wherein the seventh selection is associated with the first input; and transmitting, using the one or more computing device processors, based on the seventh selection, the first criteria for display on the second user interface associated with the second computing device associated with the fourth user.

Furthermore, the method may further comprise: transmitting, using the one or more computing device processors, based on the fourth selection or an eighth selection, the first criteria associated with the fourth user for display on the first user interface associated with the first computing device associated with the first user.

In some embodiments, the method may further comprise: receiving, using the one or more computing device processors, from the first computing device associated with the first user, an eighth selection, wherein the eighth selection comprises the second user; and transmitting, using the one or more computing device processors, based on the eighth selection, at least one criteria associated with the second user for display on the first user interface associated with the first computing device associated with the first user.

The above-described features and applications can be implemented as software processes or data engines include specified sets of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "application" or "software" is meant to include firmware residing in read-only memory or applications stored in magnetic storage, which can be read into memory for processing by a processor. Also, in some implementations, multiple software or application technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, application, script, or code) can be written in any form of programming language, including compiled or interpreted languages, declarative or procedural languages, and it can be deployed in any form, including as a standalone program or as a sub-system, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more sub-systems, sub programs, or portions of code). A computer program can be deployed to be executed on one computer or on multiple computers that are located at one site or distributed across multiple sites and interconnected by a communication network.

As used in this specification and any claims of this application, the terms "computer," "server," "processor," and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

Various terms used herein have meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

It is appreciated that the term optimize/optimal and its variants (e.g., efficient or optimally) may simply indicate improving, rather than the ultimate form of 'perfection' or the like.

It is further appreciated that any portion or element of any embodiment (structure, method, etc.) disclosed herein may be combined with any portion or element of any other embodiment (structure, method, etc.) disclosed herein.

Additionally, the section headings herein are provided for consistency with the suggestions under 37 CFR 1.77 or otherwise to provide organizational cues. These headings shall not limit or characterize the disclosed embodiment(s) set out in any claims that may issue from this disclosure. Specifically, and by way of example, although the headings refer to a "Technical Field," such claims should not be limited by the language chosen under this heading to describe the so-called technical field. Further, a description of a technology in the "Background" is not to be construed as an admission that technology is prior art to any disclosed embodiment(s) in this disclosure. Neither is the "Summary" to be considered as a characterization of the disclosed embodiment(s) set forth in issued claims. Furthermore, any reference in this disclosure to "embodiment" in the singular should not be used to argue that there is only a single point of novelty in this disclosure. Multiple embodiments may be set forth according to the limitations of the multiple claims issuing from this disclosure, and such claims accordingly define the disclosed embodiment(s), and their equivalents, which are protected thereby. In all instances, the scope of such claims shall be considered on their own merits in light of this disclosure, but should not be constrained by the headings set forth herein.

The invention claimed is:

1. A method for selectively providing access to and communicating with a computing group associated with a user, the method comprising:

determining, using one or more computing device processors, a first user accesses a first system;

receiving, using the one or more computing device processors, from a first computing device associated with the first user, a first selection, wherein the first selection comprises a first computing group associated with the first user;

transmitting, using the one or more computing device processors, the first computing group for display on a first user interface associated with the first computing device associated with the first user, wherein the first computing group comprises a second user and a third user;

receiving, using the one or more computing device processors, from the first computing device associated with the first user, a second selection, wherein the second selection comprises a structural option associated with the first computing group;

modifying, using the one or more computing device processors, based on the second selection, the first computing group associated with the first user, thereby generating a modified first computing group, wherein the modified first computing group comprises the third user and a second computing group associated with the second user;

transmitting, using the one or more computing device processors, the modified first computing group for display on the first user interface associated with the first computing device associated with the first user;

receiving, using the one or more computing device processors, from the first computing device associated with the first user, a third selection, wherein the third selection comprises the second computing group associated with the second user;

transmitting, using the one or more computing device processors, the second computing group for display on the first user interface associated with the first computing device associated with the first user, wherein the second computing group comprises the second user and a fourth user, wherein the structural option associated with the first computing group remains visible on the first user interface;

receiving, using the one or more computing device processors, from the first computing device associated with the first user, a fourth selection, wherein the fourth selection comprises the fourth user;

receiving, using the one or more computing device processors, from the first computing device associated with the first user, a fifth selection, wherein the fifth selection comprises a message option;

generating, using the one or more computing device processors, based on the fourth selection and the fifth selection, a message object, wherein the message object is associated with the fourth user, and wherein the message object is associated with a first criteria associated with the fourth user;

transmitting, using the one or more computing device processors, the message object for display on the first user interface associated with the first computing device associated with the first user;

receiving, using the one or more computing device processors, from the first computing device associated with the first user, a first input, wherein the first input is associated with the message object; and receiving, using the one or more computing device processors, from the first computing device associated with the first user, a sixth selection, wherein the sixth selection comprises a send option.

2. The method of claim 1, wherein the first computing group comprises at least three users.

3. The method of claim 1, wherein the modified first computing group comprises at least two computing groups.

4. The method of claim 1, wherein the second computing group comprises at least three users.

5. The method of claim 1, wherein the second computing group comprises at least one computing group.

6. The method of claim 1, further comprising:

determining, using the one or more computing device processors, the fourth user accesses the first system;

transmitting, using the one or more computing device processors, based on the sixth selection, the first input for display on a second user interface associated with a second computing device associated with the fourth user;

receiving, using the one or more computing device processors, from the second computing device associated with the fourth user, a seventh selection, wherein the seventh selection is associated with the first input; and transmitting, using the one or more computing device processors, based on the seventh selection, the first criteria for display on the second user interface associated with the second computing device associated with the fourth user.

7. The method of claim 6, wherein the fourth selection further comprises a fifth user.

8. The method of claim 7, further comprising:

determining, using the one or more computing device processors, the fifth user accesses the first system;

transmitting, using the one or more computing device processors, based on the sixth selection, the first input for display on a third user interface associated with a third computing device associated with the fifth user;

receiving, using the one or more computing device processors, from the third computing device associated with the fifth user, an eighth selection, wherein the eighth selection is associated with the first input; and transmitting, using the one or more computing device processors, based on the eighth selection, the first criteria or a second criteria associated with the fifth user for display on the third user interface associated with the third computing device associated with the fifth user.

9. The method of claim 1, further comprising:

transmitting, using the one or more computing device processors, based on the fourth selection or an eighth selection, the first criteria associated with the fourth user for display on the first user interface associated with the first computing device associated with the first user.

10. The method of claim 1, wherein the one or more computing device processors are comprised in one or more computing systems, wherein the one or more computing systems are located in one or more locations.

11. The method of claim 1, further comprising:

determining, using the one or more computing device processors, the fourth user has completed the first criteria; and updating, based on the determining the fourth user has completed the first criteria, at least some data comprised in or associated with the second computing group.

12. The method of claim 1, wherein:

the first user is at a first position on a hierarchy and the second user is at a second position on the hierarchy, wherein the first position is higher than the second position, the third user is at a third position on the hierarchy, wherein the first position is higher than the third position, and the fourth user is at a fourth position on the hierarchy, wherein the second position is higher than the fourth position.

13. A system for selectively providing access to and communicating with a computing group associated with a user, the system comprising:

one or more hardware computing system processors; and at least one memory storing instructions, that when executed by the one or more hardware computing system processors causes the one or more hardware computing system processors to:

determine a first user accesses a first system;

receive, from a first computing device associated with the first user, a first selection, wherein the first selection comprises a first computing group associated with the first user;

transmit the first computing group for display on a first user interface associated with the first computing device associated with the first user, wherein the first computing group comprises a second user and a third user;

receive, from the first computing device associated with the first user, a second selection, wherein the second selection comprises a structural option associated with the first computing group;

modify, based on the second selection, the first computing group associated with the first user, thereby generating a modified first computing group, wherein the modified first computing group comprises the third user and a second computing group associated with the second user;

transmit the modified first computing group for display on the first user interface associated with the first computing device associated with the first user;

receive, from the first computing device associated with the first user, a third selection, wherein the third selection comprises the second computing group associated with the second user;

transmit the second computing group for display on the first user interface associated with the first computing device associated with the first user, wherein the second computing group comprises the second user and a fourth user, wherein the structural option associated with the first computing group remains visible on the first user interface;

receive, from the first computing device associated with the first user, a fourth selection, wherein the fourth selection comprises the fourth user;

receive, from the first computing device associated with the first user, a fifth selection, wherein the fifth selection comprises a message option;

generate, based on the fourth selection and the fifth selection, a message object, wherein the message object is associated with the fourth user, and wherein the message object is associated with a first criteria associated with the fourth user;

transmit the message object for display on the first user interface associated with the first computing device associated with the first user;

receive, from the first computing device associated with the first user, a first input, wherein the first input is associated with the message object; and receive, from the first computing device associated with the first user, a sixth selection, wherein the sixth selection comprises a send option.

14. The system of claim 13, wherein the first criteria comprises at least one of: an overdue criteria, a due soon criteria, or a due later criteria.

15. The system of claim 13, wherein the message object is associated with at least two criteria.

16. The system of claim 13, wherein the fourth selection comprises a select all option.

17. A method for selectively providing access to and communicating with a computing group associated with a user, the method comprising:

determining, using one or more computing device processors, a first user accesses a first system;

receiving, using the one or more computing device processors, from a first computing device associated with the first user, a first selection, wherein the first selection comprises a first computing group associated with the first user;

transmitting, using the one or more computing device processors, the first computing group for display on a first user interface associated with the first computing device associated with the first user, wherein the first computing group comprises a second user and a third user;

receiving, using the one or more computing device processors, from the first computing device associated with the first user, a second selection, wherein the second selection comprises a structural option associated with the first computing group;

modifying, using the one or more computing device processors, based on the second selection, the first computing group associated with the first user, thereby generating a modified first computing group, wherein the modified first computing group comprises the third user and a second computing group associated with the second user;

transmitting, using the one or more computing device processors, the modified first computing group for display on the first user interface associated with the first computing device associated with the first user;

receiving, using the one or more computing device processors, from the first computing device associated with the first user, a third selection, wherein the third selection comprises the second computing group associated with the second user;

transmitting, using the one or more computing device processors, the second computing group for display on the first user interface associated with the first computing device associated with the first user, wherein the second computing group comprises the second user and a fourth user;

receiving, using the one or more computing device processors, from the first computing device associated with the first user, a fourth selection, wherein the fourth selection comprises the fourth user;

receiving, using the one or more computing device processors, from the first computing device associated with the first user, a fifth selection, wherein the fifth selection comprises a message option;

generating, using the one or more computing device processors, based on the fourth selection and the fifth selection, a message object, wherein the message object is based on or associated with a first criteria associated with the fourth user;

transmitting, using the one or more computing device processors, the message object for display on the first user interface associated with the first computing device associated with the first user;

receiving, using the one or more computing device processors, from the first computing device associated with the first user, a first input, wherein the first input is associated with the message object; and receiving, using the one or more computing device processors, from the first computing device associated with the first user, a sixth selection, wherein the sixth selection comprises a send option.

18. The method of claim 17, wherein the first user manages or oversees the second user and the third user.

19. The method of claim 17, wherein the second user manages or oversees the fourth user.

20. The method of claim 17, further comprising:

receiving, using the one or more computing device processors, from the first computing device associated with the first user, an eighth selection, wherein the eighth selection comprises the second user; and transmitting, using the one or more computing device processors, based on the eighth selection, at least one criteria associated with the second user for display on the first user interface associated with the first computing device associated with the first user.

21. The method of claim 17, wherein the first input comprises at least one of: at least one recipient, a subject, or a message.

22. The method of claim 17, wherein the one or more computing device processors are comprised in one or more computing systems, wherein the one or more computing systems are located in one or more locations.

* * * * *